United States Patent [19]

Mariani

[11] Patent Number: 5,415,501

[45] Date of Patent: May 16, 1995

[54] CHUCK ASSEMBLY AND DRILL TOOL FOR DEEP HOLE DRILLS

[76] Inventor: Eugene Mariani, 2121 Grand Ave., Morton, Pa. 19070

[21] Appl. No.: 140,567

[22] Filed: Oct. 25, 1993

[51] Int. Cl.⁶ .................. B23B 41/02; B23B 51/06
[52] U.S. Cl. ..................... 408/59; 279/20; 408/705
[58] Field of Search ............. 279/20, 83; 408/57, 408/59, 705, 239 R, 239 A, 240, 56, 60, 229

[56] References Cited

U.S. PATENT DOCUMENTS

| | | |
|---|---|---|
| 234,066 | 11/1880 | Reno . |
| 965,970 | 8/1910 | Wells . |
| 1,160,042 | 11/1915 | Carpenter . |
| 1,577,895 | 3/1926 | Conard . |
| 2,847,880 | 8/1958 | Neidig ............... 77/55 |
| 3,120,768 | 2/1964 | Williams ............. 408/705 |
| 3,136,561 | 6/1964 | McAuliffe et al. ....... 279/9 |
| 3,317,216 | 5/1967 | Muthler ............. 408/56 |
| 3,361,014 | 1/1968 | McClennan .......... 408/705 |
| 3,647,310 | 3/1972 | Morse .............. 408/239 |
| 3,701,607 | 10/1972 | Johnson ............. 408/59 |
| 3,754,767 | 8/1973 | Bennett ............. 279/14 |
| 4,158,522 | 6/1979 | Wirfelt ............. 408/705 |

FOREIGN PATENT DOCUMENTS

3314719  10/1984  Germany ................ 408/57

*Primary Examiner*—Steven C. Bishop
*Attorney, Agent, or Firm*—Famiglio & Massinger

[57] ABSTRACT

A chuck assembly and drill tool for a deep hole drilling press wherein the shank of the drill is of great length and slidably received within the chuck assembly to various depths such that complete removal of the drill for the purpose of substitution with drills of different lengths is avoided. The invention also teaches means for securing the drill within the chuck at various points along the shank's length. Prevention of lubricating and cooling oil leakage is accomplished by novel packing means which are also incorporated into the chuck assembly. In another embodiment, a separate insert may be fitted to the chuck assembly to permit reception of shanks of varying diameter. Both embodiments prevent excessive vibration, fallout and whiplashing of the enclosed drill tool.

13 Claims, 6 Drawing Sheets

CHUCK ASSEMBLY AND DRILL TOOL FOR DEEP HOLE DRILLS

FIELD OF THE INVENTION

The subject invention relates to a deep hole drill press, generally, and to improvements in the chuck assembly and drill tool therefore, in particular.

BACKGROUND OF THE INVENTION

Deep hole drill presses or "gun drill presses" as they are sometimes referred, are utilized for boring long and comparatively small diameter holes in metal objects to exacting specifications. A standard gun drill is a replaceable tool comprised, generally, of an elongate shaft having a usually carbide cutting tip situate distally, and an adaptor fixedly mounted by soldering or other means at its proximal end. The adaptor is removably mounted within a chuck assembly of a drill press, the spindle of which revolves at high speeds to accomplish boring action.

While such drills are considered by those skilled in the art to be suitable for their intended purpose, they are not without significant shortcomings. Users of the drill press are required to stock drills of various lengths in order to drill holes of various depths; long shafts for deep holes and shorter shafts for relatively shallow holes. The expense of maintaining the appropriate inventory is considerable and adds to the overall cost of the products of manufacture. Moreover, the adaptor portion of the drill adds to its overall expense as the entire unit must be manufactured or purchased upon exhaustion or breakage of a shaft or tip.

In addition to cost considerations, and as alluded to above, drill presses of the prior art require the repeated interchange of drill tools of differing lengths when boring holes of different depths. Also, when boring a single hole of considerable depth, it is sometimes necessary to begin with a shorter shaft length and progressively interchange drills of greater lengths until the desired depth of the hole is achieved. In either situation, the process becomes tedious and time consuming, involving retraction of the drill from the workpiece, removal of the drill from the chuck assembly and then insertion of a drill having a longer shank back into the press. To further complicate matters, complete removal of the tool is accompanied by unwanted oil spillage because the press operates with pressurized oil behind the adapter.

In the early seventies, efforts were made to resolve the above problems by providing a modified drill of considerable length which could be secured within a novel chuck assembly at different points along the drill's shaft to provide, effectively, different drill lengths from a single drill tool. U.S. Pat. No. 3,701,607 issued to Johnson on Oct. 31, 1972, is one such deep hole drilling tool comprised of three axially aligned, interconnected shanks of different diameter, the last of which being provided with gaskets about its circumference to prevent oil seepage from occurring between the drill and the spindle. This invention was a significant advancement in that it eliminated the requirement of complete retraction and removal of the drill from the collet when shafts of different lengths were called for.

The Johnson invention itself, however, required the manufacture of custom three tier drill tools (and a chuck assembly) which were, in essence, similar in nature to conventional drills with soldered adaptors except that the Johnson tools were capable of slidable adjustability within the spindle's bore and eliminated oil seepage. While the Johnson invention provided important improvements, it did little to control the high costs associated with replacing broken or spent drills, each of which required considerable machining to achieve the appropriate shaft diameter and proper fitting of sealing means.

The subject invention completely obviates all of the shortcomings of the prior art through modification of a standard drill adaptor into a chuck assembly capable of receiving therein various lengths of an elongate shaft. As will be better understood upon review of the summary and detailed description of the invention, below, the subject device provides a means to accomplish deep hole drilling faster and more economically than heretofore possible.

SUMMARY OF THE INVENTION

More particularly, the subject invention is comprised of a standard drill modified such that shank and adaptor are separated, the latter being further modified with a bore therethrough for slidable insertion of the shank to various depths. The adaptor thus acts as a chuck assembly to be removably mounted within the spindle portion of a press and is further adapted with shank securing means to fix the tool in place. Prevention of lubricating oil leakage is accomplished by novel packing means which may be further incorporated into the chuck assembly. In another embodiment, a separate insert may be fitted to the chuck assembly to permit reception of shanks of varying diameter. Both embodiments prevent excessive vibration, fallout and whiplashing of the enclosed drill tool.

Accordingly, it should be appreciated that the aforementioned improvements provide a novel chuck assembly which need be purchased only once, and that a single drill tool of relatively long shaft length replaces the plurality of drills of various lengths, along with their attached adaptors, formerly required by prior art presses.

It is, therefore, a primary object of this invention to provide a novel chuck assembly for deep hole drill presses whereby repeated interchange of drills having different lengths is avoided; rather, only a single drill of great length is required which may be mounted within the chuck assembly at various points along its extended length.

Another object of the present invention is to reduce the cost of replacement drills by eliminating the adaptor portions thereof and substituting them with a single chuck assembly, adapted to receive the remaining shank therein, which must be purchased only once.

Another object of the invention is to provide for reduction of the number of stock drills of all lengths to just a few of the longer lengths of such gun drills, as the chuck assembly of this invention provides for the use of long drills in making holes of a very short depth.

Another object of this invention is to provide for a high efficient flow of lubricating oil through the drill while simultaneously preventing unwanted leakage from the drill press.

Still another object of the subject invention is to provide a chuck assembly capable of receiving therethrough long shanks of different diameter.

Still another object of the subject invention is to provide a drill press capable of receiving therein lengths of shank not heretofore possible.

Other objects and advantages of the present invention will be apparent upon reference to the accompanying description when taken in conjunction with the following drawings in which similar reference numerals or characters designate similar parts.

DETAILED DESCRIPTION OF THE PREFERRED EMBODIMENT

Figure 1:
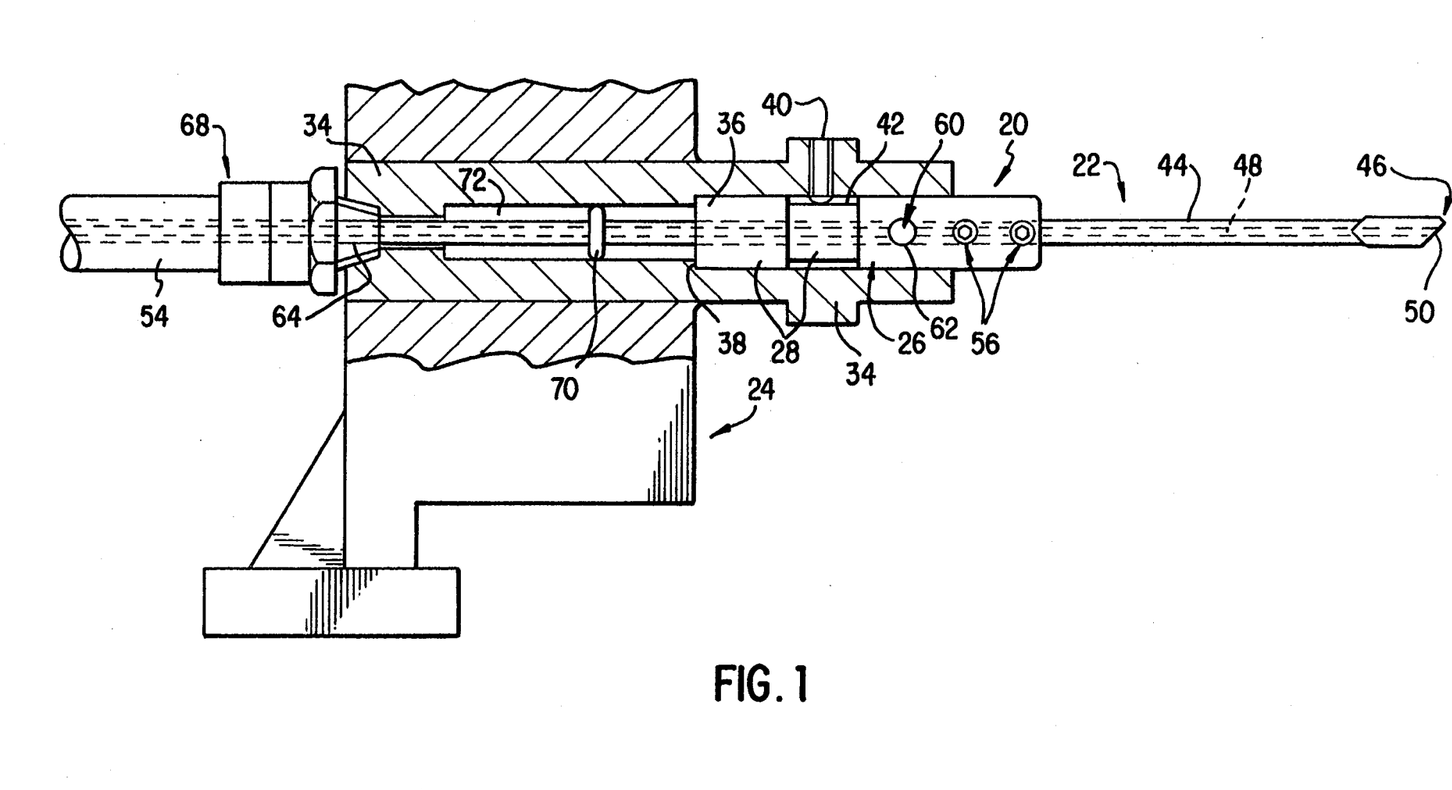
FIG. 1 is a side view of the subject deep hole drilling chuck assembly mounted within a drill press, portions of each being depicted in phantom line and broken view to better illustrate it features and advantages.
Figure 2:
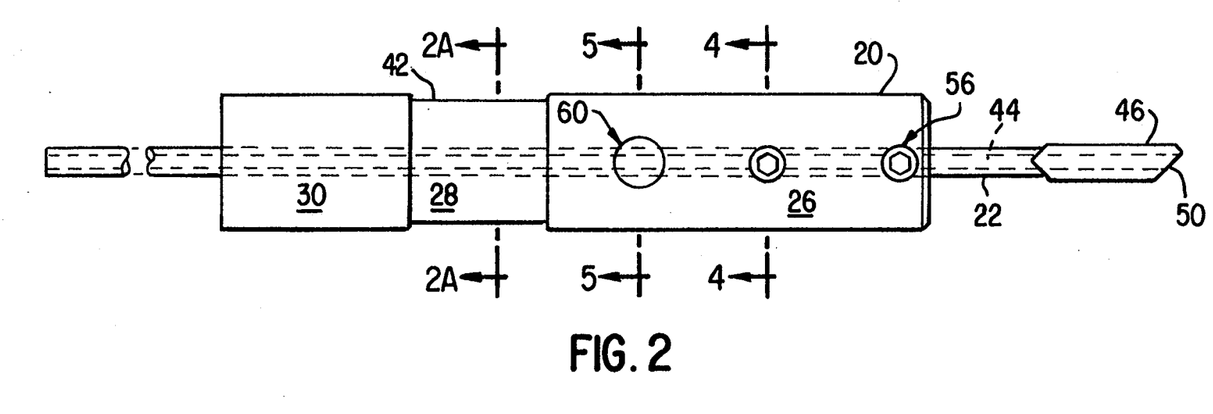
FIG. 2 is an enlarged side view of the subject deep hole drilling chuck assembly removed from the drill press of FIG. 1.
Figure 2A:
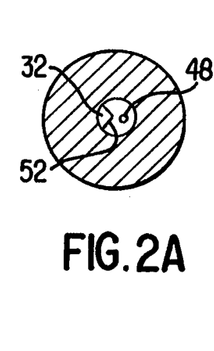
FIG. 2A is a cross sectional view of the invention of FIG. 2, taken along line A—A.

Reference is now made to FIG. 1 in which there is depicted a side view of the subject deep hole drilling chuck assembly and drill tool, designated generally by reference numerals 20 and 22, respectively, and mounted within a drill press 24. Chuck assembly 20, as more clearly depicted in FIG. 2, is comprised of a cylindrical body having centrally aligned front, middle and rear sections 26, 28 and 30, respectively; the middle section being of slightly smaller diameter than the front and rear sections which are of equal diameter. Chuck assembly 20 is further comprised of a central bore 32 (FIG. 2A) which extends axially through sections 26, 28 and 30 which are preferably of unibody construction formed by machining a single metallic piece. Chuck assembly 20 is slidably received within rotatable spindle 34 of press 24 until shoulder 36 engages corner 38. Removable mounting of chuck 20 is accomplished by means of set screw 40 radially mounted within and reciprocally threaded with spindle 34 until sufficient contact with surface 42 of middle section 28 is made such that longitudinal immobility is achieved.

Figure 3:
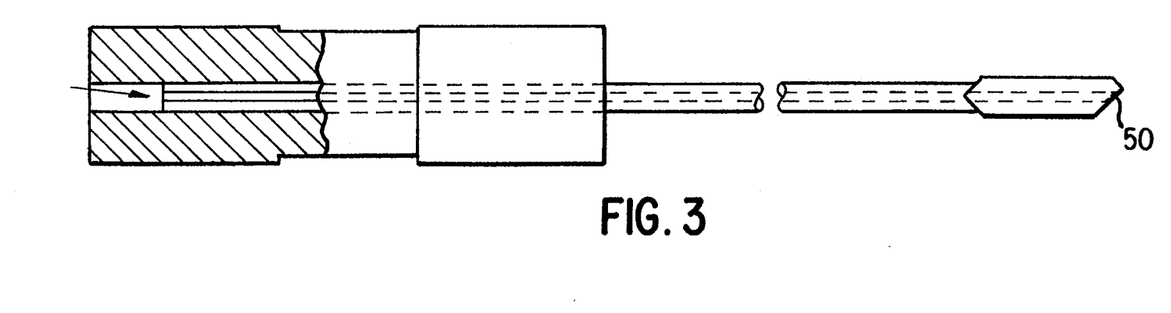
FIG. 3 is a side view of a conventional gun drill having adaptor, shank and cutting tip components.

Gun drilling tool 22 is comprised of an elongate shank 44 terminating proximally in cutting tip 46 which is typically of a carbide composition. Tip 46 and shank 44 are fixedly mounted to one another in the conventional manner by brazing or other suitable means. As may best be appreciated by reference to FIG. 3A, shank 44 is tubular having a bore 48 extending through its length and terminating in opening 50 of tip 46. It can also be observed that a V-shaped channel 52 also extends the entire length of shank 44. In operation, cutting fluid is forced under high pressure through feed pipe 54 (FIG. 1) into bore 48 and out of opening 50 to provide a cooling and lubricating effect to drill 22 and the workpiece (not shown). As drill 44 rotates, cutting fluid and filings travel back towards press 24 and escape the workpiece through channel 52.

Figure 4:
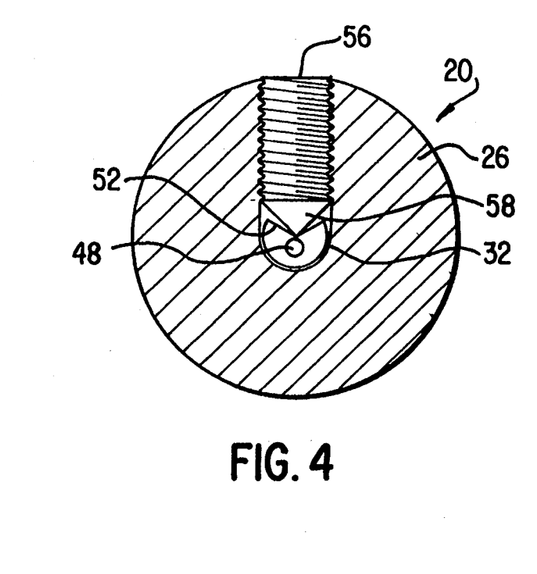
FIG. 4 is a cross sectional view of the novel chuck assembly of FIG. 2 taken along line 4—4, and depicting the drill securing means in greater detail.

In preparation of operation, however, shank 44 must first be secured within chuck assembly 20. Attachment is accomplished by securing means preferably comprised of two radially extending conepoint, headless, allen hex set screws 56 which are reciprocally threaded within front section 26 of chuck assembly 20. As best understood upon reference to FIG. 4, the cone points 58 engages channel 52 of shank 44 thus preventing both longitudinal movement and axial rotation of the latter within bore 48. Caution must be exercised to prevent damage to shank 44 by overtightening. An alternative means of securing shank 44 within chuck 20 is discussed below.

Figure 6:
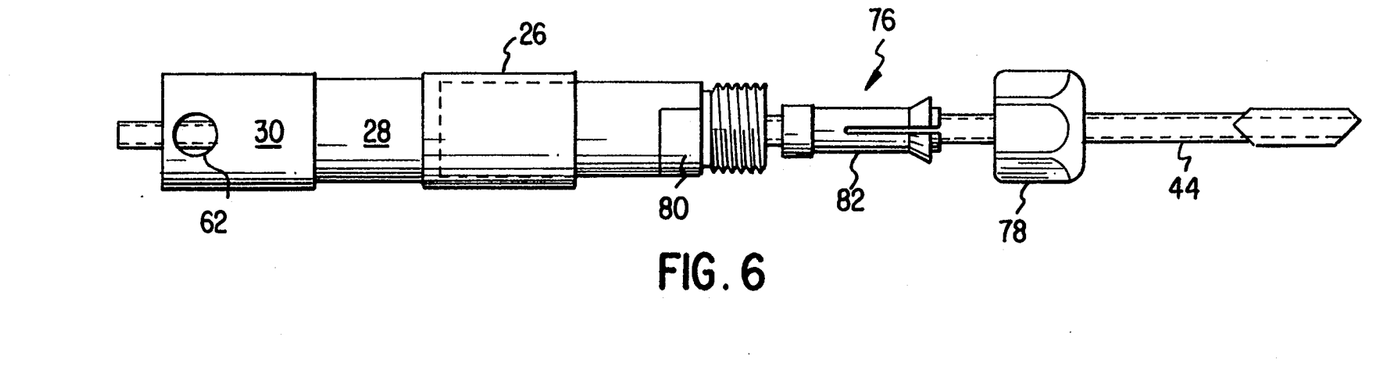
FIG. 6 is an enlarged side view of another embodiment of the subject invention adapted with a standard clutch assembly, shown in exploded view, as the drill securing means.
Figure 7:
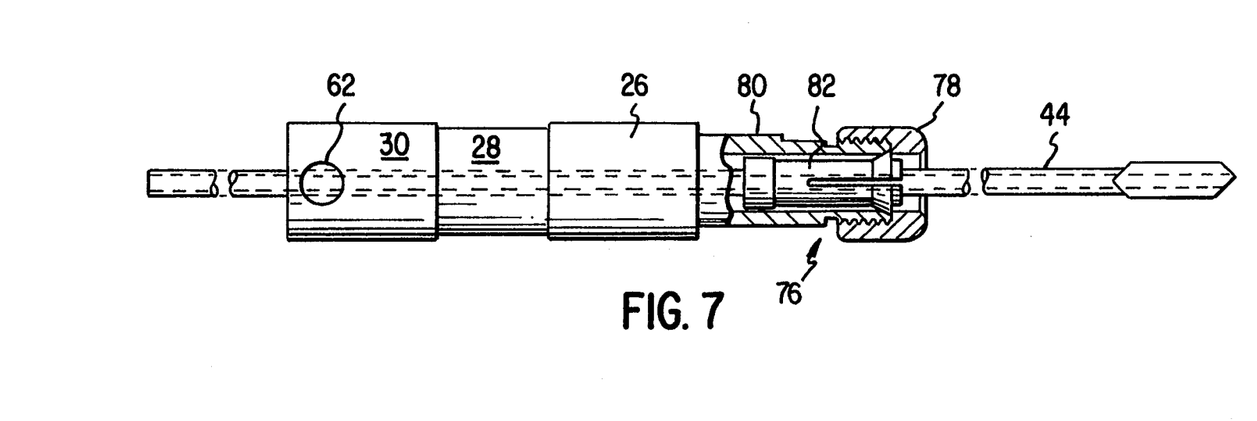
FIG. 7 is an enlarged side view of the invention of FIG. 6 with drill securing means assembled.

FIGS. 6 and 7 depict side views of a standard clutch assembly, generally designated by reference numeral 76, shown in exploded and assembled configurations, respectively. A threaded nut 78 and reciprocally threaded sleeve member 80 cooperate to permit split collet 82 to grip shank 44 (FIG. 7). Sleeve member is shown situate within chuck assembly 20 which is adapted for this purpose, but these components may also be of unibody construction. It should be understood that, like the double hex screw embodiment above, the clutch assembly 76 extends beyond the confines of spindle 34 when inserted into press 24. It should also be noted that packing hole 62 and plug 60 have been relocated to the rear section 30 of chuck 20 in this particular embodiment and function in an identical manner. Thus, it can be appreciated that the precise location of these elements within either the front or rear sections 26 and 30 is immaterial so long as plug 60 is able to contact the inner surface of spindle 34 such that it is held firmly in place.

Figure 5:
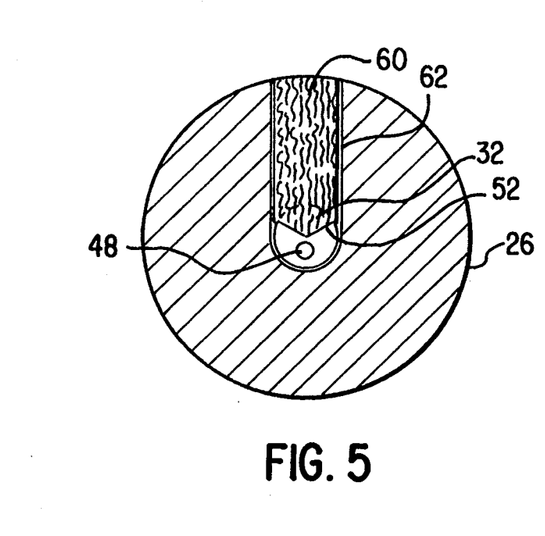
FIG. 5 is a cross sectional view of the novel chuck assembly of FIG. 2 taken along line 5—5, and depicting the packing means employed to prevent oil leakage from the press apparatus.

Once mounted within chuck 20 such that the desired length of drill 22 is exposed, a cylindrical plug 60, is inserted into radially extending packing hole 62 of front section 26 (FIG. 5). Plug 60 is of a composition similar to that of a cigarette filter and is capable of expansion within packing hole 62 so as to conform to its contour as well as to that of the underlying shank 44. Referring once again to FIG. 1, it can be observed that set screws 56 and plug 60 all radiate along the same longitudinal plane.

Upon mounting of drill 22 within chuck assembly 20 and insertion of plug 60 into packing hole 62, chuck assembly is slidably received into spindle 34 in the manner described above. Note in FIG. 1, that when insertion is accomplished, plug 60 is held in place by the inner surface of spindle 34 while set screws 56 remain exposed to the press operator. It is in this configuration that the intended objects of the subject invention may be carried out. More specifically, longitudinal adjustment of shank 44 within spindle 34 may be accomplished for the drilling of shallow or deep holes using a single drill 22. Repeated interchange of drills having different lengths is thereby avoided. Note also that when a relatively short portion of shank 44 is exposed for drilling, the balance of its length must necessarily be housed within, and in fact beyond, press 24. In this situation, the proximal end of shank 44 extends through the high pressure oil couplings 64 and into the oil feed pipe 54. Such a configuration is made possible through modification of press 24 as described below, and permits press 24 to receive lengths of shank not heretofore possible.

Provided the tubing assembly 68 is centered on the longitudinal axis of press 24, the proximal end of shank 44 may be inserted through holes in the oil couplings 64 enlarged for that purpose. Instead of conventional metal tubing, steel meshed hydraulic tubing can be used behind the drill press for greater resiliency, and, depending on its length, can retain shank lengths of virtually any length.

Another of the intended objects of the present invention is the prevention of oil seepage along channel 52, through bore 32 to the exterior of spindle 34. As can be appreciated from observation of the invention as configured in FIG. 5, plug 60 prevents unwanted loss of cooling fluid thereby maintaining oil pressure within the system and providing for the more efficient flow of lubricant into bore 48 and out of opening 50 where it is needed.

Figure 12:
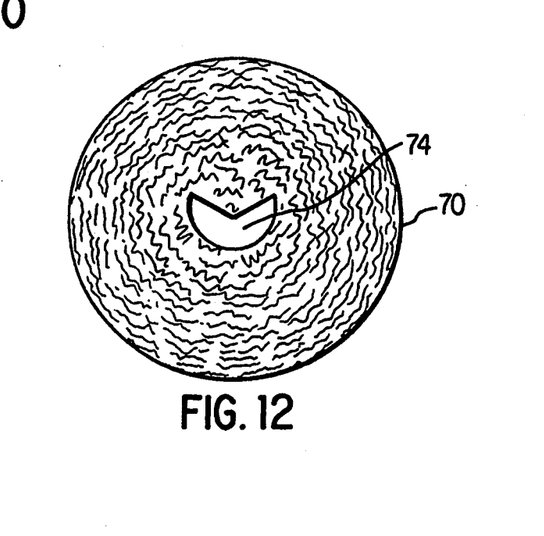
FIG. 12 is an end view of another sealing means optionally employed to prevent leakage of lubricating oil.

In another embodiment, a different sealing means may be employed instead of, or in addition to, the plug 60 just described. A wool fiber disc 70, having a composition similar to that used for buffing wheels, is inserted about the shank 44 of drill 22 prior to insertion into press 24. Upon application of oil pressure, disc 70 swells immediately upon contact with lubricating oil emanating from feed pipe 54, thus creating a seal about shank 44 and the inner walls of chamber 72. FIG. 12 is an end view of disc 70 revealing a V-shaped slit 74 of relatively the same outer dimensions of channel 52 such that disc 70 may better conform to its shape and provide a superior seal.

Figure 8:
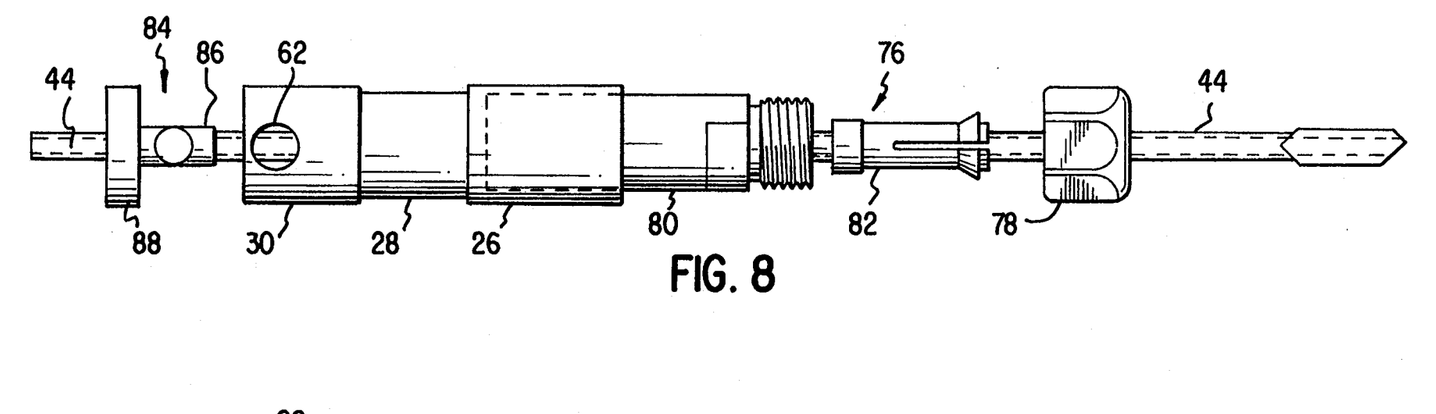
FIG. 8 is an enlarged side view of another embodiment of the subject invention adapted with an insert and standard clutch assembly for receiving shanks of various diameter.
Figure 10:
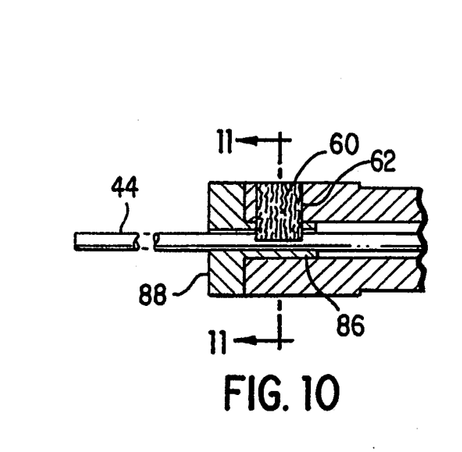
FIG. 10 is a sectional view of the insert of FIG. 8 disposed within the clutch assembly.

Finally, the subject invention may also be adapted to receive drills of different diameters. Referring now to FIG. 8, an insert 84 can be seen disposed about shank 44 behind chuck 20 which is preferably of the clutch assembly type embodiment, discussed above (see text accompanying FIGS. 6 and 7). Insert 84 has a generally T-shaped configuration and is comprised of a hollowed cylindrical cantilever 86 having an outer diameter capable of being slidably received within central bore 32 of chuck 20 (FIG. 10) and an inner diameter capable of slidably receiving a shank 44 of any desired diameter. For example, the clutch assembly 20 of FIG. 8 may be manufactured to receive $\frac{3}{4}''$ drills 22 within its central bore 32. By using the clutch assembly 76 and insert 84 with its reduced inner diameter, chuck 20 may now accommodate a $\frac{1}{2}'$ drill tool 22. Similarly, chuck 20 can be adapted to accommodate even the smallest drills 22 so long as insert 84 and collet 82 are of equal size. A disc 88 is further provided to facilitate insertion and removal of insert 84 into and out of that portion of bore 32 occupying the rear section 30 of chuck assembly 20.

Figure 9:
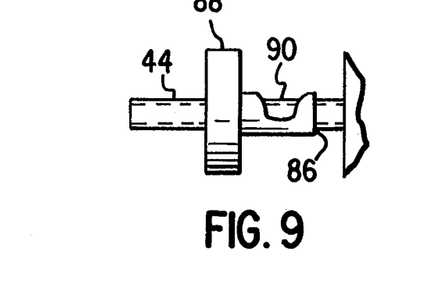
FIG. 9 is a side view of the insert of FIG. 8 rotated 90 degrees about its longitudinal axis.
Figure 11:
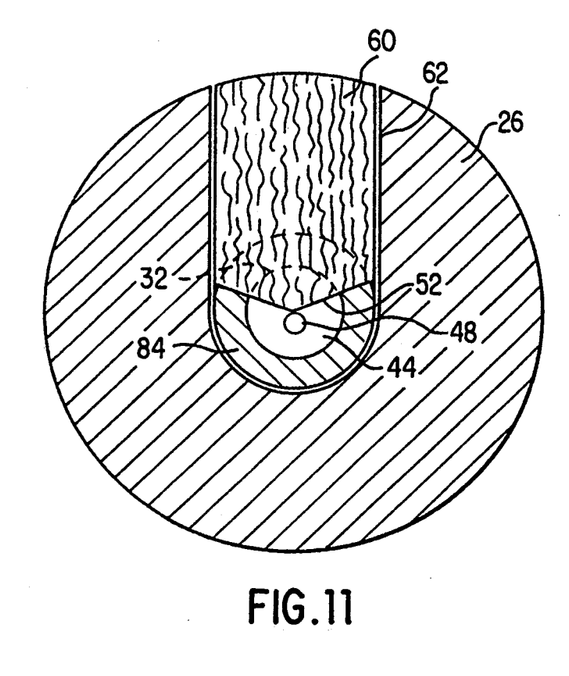
FIG. 11 is a cross sectional view of the invention of FIG. 10 taken along line 11—11 depicting the inner relationship of packing means and insert.

As best illustrated in FIG. 9, a portion of cantilever 86 of insert 84 is cut away to form notch 90 of equal diameter to that of packing hole 62. Insert 84 is received within bore 32 and rotated until notch 90 and packing hole 62 are in alignment. Plug 60 is then inserted until it makes contact with channel 52 of shank 44, as best illustrated in FIG. 11, to provide sealing of the unoccupied portions of central bore 32 and interior of cantilever 86. It should further be appreciated that insert 84 acts to stabilize drill 22 within chuck 20 by providing a second point of fixation along its length. This configuration assures that proper central alignment of drill 22 will be achieved to achieve proper drilling results in the workpiece. Moreover, insert 84 reduces vibration, runout and whiplashing which would otherwise occur if a single point of fixation were employed.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed is:

1. In a deep hole drilling apparatus, a combination chuck assembly and deep hole drilling tool, comprising:
    a) a cylindrical chuck having a first bore extending axially therethrough for slidable reception of a drill tool therein; said drill tool having a second bore extending axially therethrough for the passage of fluid;
    b) means for securing said drill tool within said first bore at an infinite number of points along the length of said drill tool;
    c) a third bore extending radially through said cylindrical chuck and communicating with said first bore; and
    d) packing material inserted within said third bore, and communicating with said drill tool such that loss of said fluid through said first bore is prevented.

2. The combination chuck assembly and deep hole drilling tool of claim 1, wherein said cylindrical chuck has centrally aligned front, middle and rear sections; said middle section having a smaller outer diameter than said front and rear sections which are of equal diameter; said front section housing said third bore.

3. The combination chuck assembly and deep hole drilling tool of claim 2, wherein said drill tool is further comprised of a V-shaped channel which extends the length of said shank.

4. The combination chuck assembly and deep hole drilling tool of claim 3, wherein said means for securing said drill tool within said first bore is comprised of at least one set screw and reciprocally threaded fourth bore extending radially through said front section and communicating with said first bore; said set screw having a cone point to engage said V-shaped channel of said shank when said screw is tightened thereby securing said drill tool in place.

5. The combination chuck assembly and deep hole drilling tool of claim 3, wherein said means for securing said drill tool within said first bore is comprised of a clutch assembly fixedly mounted to said front section of said chuck; said clutch assembly further comprising a threaded sleeve member fixedly attached to said front section, a reciprocally threaded nut and a split collet disposed between said nut and said sleeve member, whereby said drill tool is gripped by said collet and secured within said first bore upon tightening said nut about said sleeve.

6. The combination chuck assembly and deep hole drilling tool of claim 4, wherein that portion of said front section housing said means for securing said drilling tool within said first bore remains exposed to access by the user upon disposition of said chuck within a spindle.

7. The combination chuck assembly and deep hole drilling tool of claim 5, wherein that portion of said front section housing said means for securing said drilling tool within said first bore remains exposed to access by the user upon disposition of said chuck within a spindle.

8. The combination chuck assembly and deep hole drilling tool of claim 4, wherein one end of said third bore abuts the inside surface of a spindle when said chuck is disposed within the spindle, thereby providing a means for retaining said packing means within said third bore.

9. The combination chuck assembly and deep hole drilling tool of claim 5, wherein one end of said third bore abuts the inside surface of a spindle when said chuck is disposed within the spindle, thereby providing a means for retaining said packing means within said third bore.

10. In a deep hole drilling apparatus, a combination chuck assembly and deep hole drilling tool, comprising:
   a) a cylindrical chuck having a first central bore extending axially therethrough;
   b) a drilling tool having an elongate shank;
   c) a cylindrical cantilever having a second central bore extending axially therethrough; said cantilever having an outer diameter capable of slidable reception within said first central bore; said cantilever further having an inner diameter smaller than said outer diameter;
   d) means for securing said drill tool within said first and second bores at an infinite number of points along the length of said shank;
   e) a third bore extending radially through said cylindrical chuck and said cantilever and communicating with said second bore; and
   f) packing material inserted within said third bore, and communicating with said drill tool when disposed within said second bore such that loss of said cutting fluid through said second bore is prevented;
   whereby drill tools having a diameter smaller than said first central bore may be securely received within said chuck through the insertion of a cantilever having an inner diameter relatively equal to that of the drill tool.

11. A deep hole drilling apparatus, comprising:
   a) a rotatable spindle having a first central bore extending axially throughout the length of said spindle and communicating distally with an axially aligned fluid feed tube;
   b) a chuck having a second central bore extending axially the length of said chuck; said chuck being removably mounted within the proximal end of said spindle such that said first central bore and said second central bore are concentrically oriented;
   c) a drilling tool having an elongate tubular shank;
   d) a third bore extending radially through said chuck and communicating with said second bore; and
   e) packing material inserted within said third bore and communicating with said drill tool such that loss of said fluid through said second bore is prevented;
   whereby said drill tool may be slidably received within said first and second central bores, and within said oil feed tube to various depths such that relatively long or short lengths of said shank may be exposed for drilling.

12. The deep hole drilling apparatus of claim 11, wherein said fluid feed tube is steel meshed hydraulic tubing.

13. The deep hole drilling apparatus of claim 11, further comprising fluid feed tube couplings situate between said spindle and said fluid feed tube; the inner bore of said couplings have a diameter sufficient to receive said shank therethrough.

* * * * *